United States Patent [19]

Fukatani

[11] Patent Number: 4,660,695
[45] Date of Patent: Apr. 28, 1987

[54] DIAPHRAGM SPRING HOLDING STRUCTURE FOR CLUTCH COVER ASSEMBLY

[75] Inventor: Yasunobu Fukatani, Hirakata, Japan

[73] Assignee: Kabushiki Kaisha Daikin Seisakusho, Osaka, Japan

[21] Appl. No.: 690,019

[22] Filed: Jan. 9, 1985

[30] Foreign Application Priority Data

Jan. 19, 1984 [JP] Japan .............................. 59-5891[U]

[51] Int. Cl.⁴ ...................... F16D 13/71; F16D 13/50
[52] U.S. Cl. ............................... 192/89 B; 192/70.13; 192/70.27; 192/109 R; 192/114 R; 192/DIG. 1
[58] Field of Search ................ 192/89 B, 70.13, 70.27, 192/114 R, 109 R, 30 R, DIG. 1

[56] References Cited

U.S. PATENT DOCUMENTS

| 2,138,169 | 11/1938 | Hunt | 192/70.27 |
| 3,939,951 | 2/1976 | Sink et al. | 192/89 B |
| 4,109,368 | 8/1978 | Hubbard et al. | 192/89 B X |

FOREIGN PATENT DOCUMENTS

| 1151440 | 7/1963 | Fed. Rep. of Germany | 192/89 B |
| 2077372 | 12/1981 | United Kingdom | 192/89 B |

Primary Examiner—Rodney H. Bonck
Assistant Examiner—Richard M. Lorence
Attorney, Agent, or Firm—Armstrong, Nikaido, Marmelstein & Kubovcik

[57] ABSTRACT

A clutch cover assembly including a clutch cover having a plurality of circumferentially spaced tabs around its inner periphery and radially inwardly projecting projections intermediate such tabs, a diaphragm spring having a plurality of slits aligned with the tabs, each of the tabs passing through a slit, a pair of wire rings on opposite sides of the diaphragm spring, the ends of the tabs passing through the slits being bent around the wire ring at one side of the diaphragm spring to engage such wire ring with one side of the diaphragm spring and to clamp the wire ring at the other side of the diaphragm spring between the diaphragm spring and the inside of the clutch cover and a removable spacer ring between the inside of the clutch cover projection and the diaphragm spring to hold the diaphragm spring compressed on the inside of the cover.

4 Claims, 5 Drawing Figures

DIAPHRAGM SPRING HOLDING STRUCTURE FOR CLUTCH COVER ASSEMBLY

FIELD OF THE INVENTION

This invention relates to a diaphragm spring holding structure for a clutch cover assembly in which a diaphragm spring is supported by a clutch cover.

DESCRIPTION OF THE PRIOR ART

A clutch cover assembly is already known; wherein a tab is integrally provided on plural places of a clutch cover inner periphery. The tab is passed through a slit of a diaphragm spring disposed in the clutch cover and is bent to hold from the inside, a pair of wire rings thereby holding both surfaces of the diaphragm ring, thus eliminating a stud pin.

In the above-mentioned structure, however, there is a disadvantage that the diaphragm spring is in an approximately free state before being assembled in a clutch and can damage the straps interposed between the pressure plate and the clutch cover through the contacting pressure plate. Especially during transportation etc., the straps can be bent or broken due to vibration which might occur.

In a clutch cover assembly of a type not using the diaphragm spring but using a coil spring, a mechanism fastening the clutch cover and the pressure plate with bolts is employed. In the type using the diaphragm spring, however, holes for passing the bolts must be formed. This mechanism is hard to be employed.

Further, a mechanism interposing a coned disc spring between a clutch cover inner periphery and the diaphragm spring may be used. In this case, however, there are disadvantages not only of an increase in manufacturing cost but in the difficulty in setting the diaphragm spring in place in a holding position. The coned disc spring is subject to deformation due to vibration during transportation etc.

SUMMARY OF THE INVENTION (Object of the Invention)

An object of the invention is to provide the following functions by means of a simple mechanism in such a manner that the diaphragm spring can be securely held in place, in a compressed state even before the spring is assembled in a clutch. Such functions are:

(a) To prevent deformation of a clutch cover outer peripheral part;
(b) To minimize dispersion of a stopping position of a lever tip end of a diaphragm spring inner peripheral end; and
(c) To prevent a bad influence on a the straps caused by vibration etc. during transportation.

(Composition of the Invention)

In the invention, clutch cover assembly includes spaced tabs integrally provided at plural spaced places of a clutch cover around the inner periphery, of the cover. The tabs pass through slits of a diaphragm spring disposed in the clutch cover and are bent to hold inside the cover a pair of wire rings at the opposite surfaces of the diaphragm spring. To adapt the clutch cover and diaphragm spring assembly to be held in a compressed state similar to the set-in-clutch state after the cover and diaphragm spring are assembled in a clutch, a removable spacer ring is inserted between projecting ends of the cover and the diaphragm spring.

DETAILED DESCRIPTION OF THE INVENTION

Figure 1:
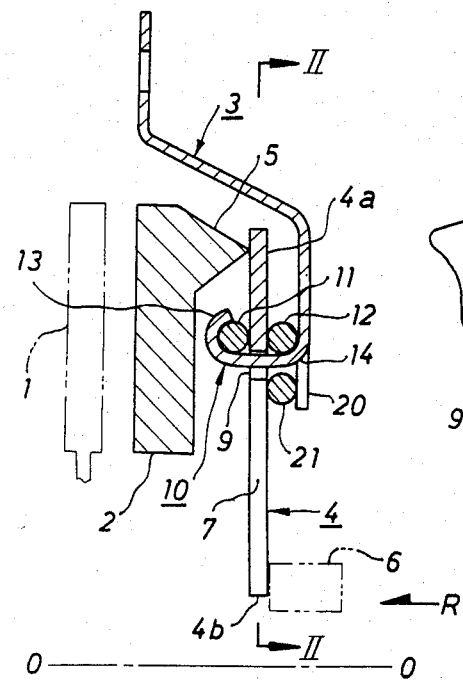
FIG. 1 is a vertical sectional partial view of the clutch cover assembly employing the diaphragm spring holding structure according to this invention.

In FIG. 1 which is the vertical sectional schematic partial view, 0—0 is a center line of a clutch output shaft (not shown), 1 is a clutch facing shown in phantom, 2 is a pressure plate, 3 is a clutch cover, and 4 is a diaphragm spring used as a clutch spring. An outer peripheral part 4a of the spring 4 presses on a projection 5 of the pressure plate 2 opposite to the side of pressure plate 2 facing clutch facing 1. An inner peripheral part 4b of the spring 4 engages release bearing 6 disposed around the output shaft (not shown) of the clutch assembly.

Figure 2:
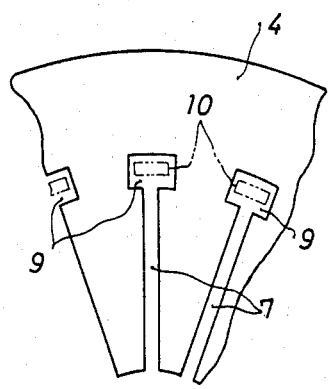
FIG. 2 is a sectional partial view taken on a line II—II of FIG. 1.
Figure 3:
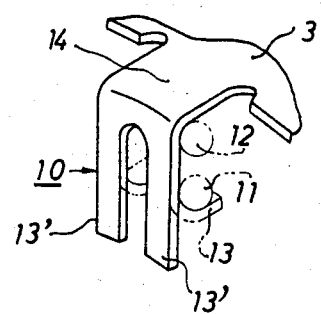
FIG. 3 is a perspective partial view of a tab in the course of its forming process.

As shown in FIG. 2 at the sectional view taken on the line II—II of FIG. 1, the spring 4 has a plurality of radial slits 7 extending radially outwardly from its inner periphery. A radial outer end portion of each slit 7 widens in a circumferential direction to form an enlarged open portion 9. A plurality of tabs 10 extending approximately parallel to the center line 0—0 toward the pressure plate 2 and are intergrally formed on an inner peripheral part of the cover 3. Tabs 10 extends through the enlarged open portion 9 of the slit 7 between the pressure plate 2 and the spring 4. As best shown in FIGS. 1 and 3, annular rings 11 and 12 are disposed along opposite faces of the spring 4 and are held radially from the inside of the clutch cover 3, by tip end 13 of the tab 10 bent radially outwardly of the clutch to hold ring 11 from the plate 2 side of cover 3. The other ring 12 is held by a tab base 14 (an inner peripheral part of cover 3) extending approximately in the radial direction of the clutch cover from a side opposite to the spring 4.

In FIG. 3 which is a perspective partial view, 13' is a tip end before being bent. After inner peripheries of the wire rings 11 and 12 are fitted onto the tab 10, the tip end 13' is bent, such as, by a hydraulic press, to the above-mentioned position as shown by a two-dot chain line 13 to be folded around the wire ring 11.

Figure 4:
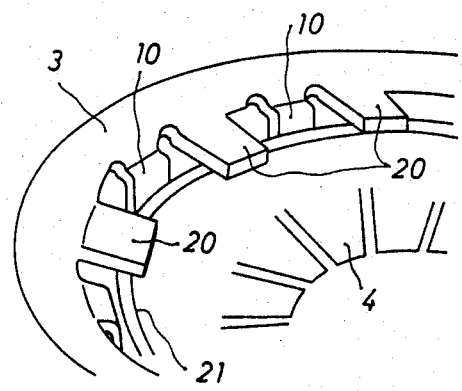
FIG. 4 is a perspective partial view of the clutch cover assembly.
Figure 5:
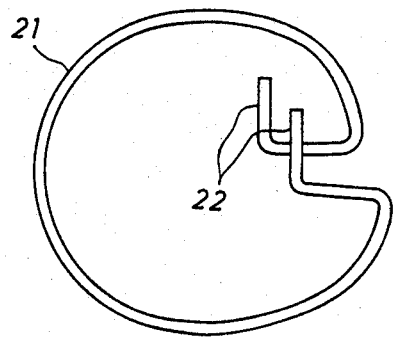
FIG. 5 is a perspective view of a removable spcer ring used with the cover and diaphragm assembly.

As shown in FIG. 4, a tongue-like projection 20 projecting forward the clutch center line 0—0 is integrally formed between the tabs 10 spaced equally in the clutch circumferential direction respectively. The projection 20 exists extendedly approximately in the clutch radial direction, and a removable spacer ring 21 is fit between the projection 20 and the spring 4. As best shown in FIG. 5, ring 21 has an approximately annular shape with one place cut apart and is formed of a spring steel or a resin having elasticity. Under a free state, inwardly bent portions of separated parts of the ring 21 are spaced apart from each other, and their inner peripheral side ends are bent normally in the direction of center line to integrally form grips 22. The ring 21 has a circular section the diameter of which is so sized that, when the ring 21 is fitted between the spring 4 and the projection 20, as illustrated in FIG. 1, the spring 4 will be held at approximately the same compressed state as in the fully assembled clutch.

Removable spacer ring 21 is inserted after completion of a calibration work at the time, for example, when the setting load characteristic is checked in advance of assembling the clutch cover assembly onto the flywheel. In this case, the spring 4 is held in the compressed state by using a calibration device (not shown) and removable spacer ring 21 is brought to an inner peripheral side of the clutch cover 3 with a radius of the ring 21 minimized by gripping and drawing the grips 22, removable spacer ring 21 is inserted between the spring 4 and the projection 20 and the grips 22 are released. The elasticity of removable spacer ring 21 snaps the ring in place. When the calibration load applied on the spring 4 is released, the spring 4 presses on the ring 21 holding spring 4 compressed as shown in FIG. 1. The pressure plate 2 is always urged elastically toward the tab 10 parallel with the center line 0—0 by means of a strap plate (not shown) and moves according to a position of the spring 4. Thus the projection 5 keeping contact with the spring 4.

Under the state of FIG. 1, the clutch cover assembly is approximately in the same condition as when assembled on the flywheel. Deformation of the clutch cover 3, bad influence on the strap plate and other troubles will not arise even when the assembly is stored separately for a long time or subjected to vibration during transportation. Further, when the clutch cover assembly is being assembled on the flywheel, the position of the inner peripheral part 4b is not only roughly in place but the pressure plate 2 does not project toward the facing 1 side because the spring 4 is held in the prescribed compressed state by removable spacer ring 21. The assembly work will become easy.

When the assembling of the clutch cover assembly to the clutch is completed, and spring 4 is brought to the compressed state, then the ring 21 is removed by gripping the grips 22 (FIG. 5). After removal of the ring 21, the clutch will function, as follows. When a clutch pedal (not shown) is stepped on, the release bearing 6 of FIG. 1 is moved toward the facing 1 side, as shown by an arrow R to push the spring inner peripheral part 4b. Spring 4 is deformed with the ring 11 as its fulcrum so as to separate the ouer peripheral portion 4a from the facing 1. Thus a pressing force on the spring will be released or decreased to disengage the clutch. When the clutch pedal is released, the spring 4 will deform with the ring 12 as its fulcrum by means of an elastic force of the spring in the reverse direction. Plate 2 will press the facing 1 against the flywheel (not shown), by means of the elastic force of the spring 4 and the clutch will be engaged.

(Effect of the Invention)

The projection 20 projecting toward the center is integrally formed on plural places of the clutch cover 3 inner periphery, and the diaphragm spring is adapted to be held in the similar compressed state as the set-in-clutch state by fitting the removable spacer ring between the projection 20 and the diaphragm spring 4. The following advantages are obtainable:

(a) The composition is simple and the spring 4 can be securely held in place;

(b) Attachment and detachment of the ring 21 are extremely easy as compared with the type using bolts;

(c) Deformation of the clutch cover 3 can be avoided;

(d) Not only the dispersion of stopping position of the inner peripheral part 4b of the spring 4 can be minimized but the pressure plate 2 does not project largely from the cover 3, so that the assembling to the clutch becomes easy;

(e) Bad influence on the strap plate caused by vibration etc. during transportation is avoided;

(f) Portions, which have been cut out in the conventional clutch cover assembly of the type using the tab, become effectively utilized.

The shape of the ring 21 is not limited to that of FIG. 5, but may be pieces or a square-sectioned piece, for example, may be used.

The grips 22 of the ring 21 may be painted with a bright color such as red etc. to avoid failure to remove spacer ring 21 after the clutch and flywheel are assembled.

What is claimed is:

1. A clutch cover assembly comprising a clutch cover having an inside, an outside and an inner periphery, a plurality of circumferentially spaced tabs around its inner periphery, a diaphragm spring disposed on the inside of said clutch cover and having a plurality of slits spaced around said diaphragm spring and aligned with said tabs, each of said tabs passing through a respective one of said slits, a pair of wire rings on on said tabs, said tabs passing through said slits in said diaphragm spring and engaging the inner periphery of each wire ring of said pair of wire rings and engaging a first wire ring of said pair of wire rings between the inside surface of said clutch cover and one surface of said diaphragm spring and engaging the second wire ring of said pair of wire rings with the other surface of said diaphragm spring, said clutch cover having projections intermediate said tabs and projecting radially inwardly at the inner periphery of said cover, a removable spacer ring between said projections and said diaphragm spring and extending around the inner periphery of said clutch cover between said cover projections and said diaphragm spring, said removable spacer ring, said tabs and said wire rings compressing said diaphragm spring and holding said diaphragm spring in compressed position on said clutch cover.

2. A clutch cover assembly as set forth in claim 1, in which said cover projections have a tongue-like shape extending approximately in a clutch radial direction.

3. A clutch cover assembly as set forth in claim 1 in which said removable spacer ring has an approximately annular shape with one place cut apart and is formed of a spring material.

4. A clutch cover assembly as set forth in claim 3, in which said removable spacer ring has spaced inwardly, bent end portions extending normal to the direction of the center line of said spacer ring to form grips.

* * * * *